May 21, 1957  JIICHIRO YONEMOTO  2,792,886
FLOWER STEM CUTTER
Filed July 17, 1956
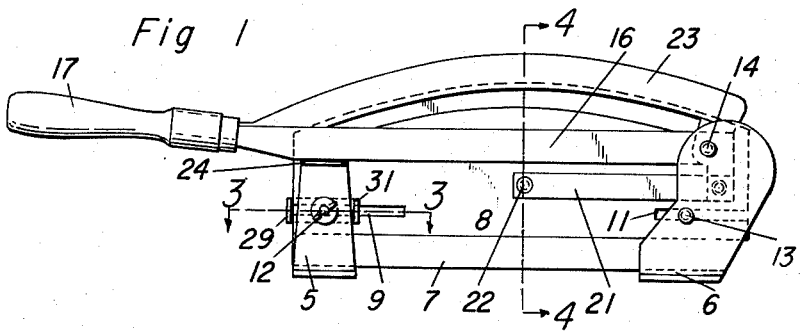
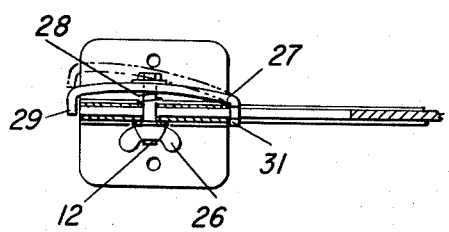
Fig 3
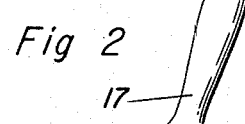
Fig 2
Fig 4
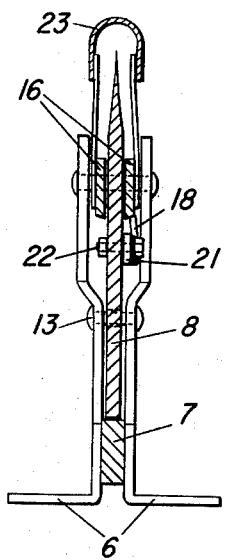
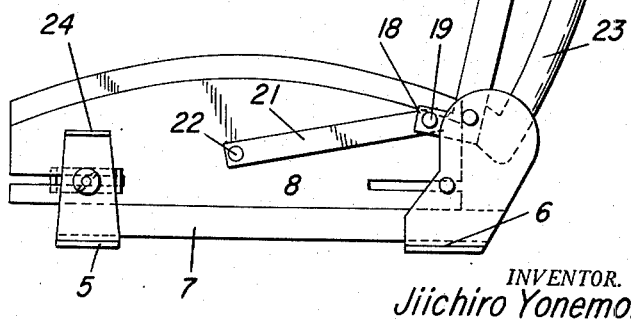
INVENTOR.
Jiichiro Yonemoto
BY
Att'y

2,792,886

FLOWER STEM CUTTER

Jiichiro Yonemoto, Los Angeles, Calif.

Application July 17, 1956, Serial No. 598,457

2 Claims. (Cl. 164—53)

This invention relates to improvements in a cutting knife particularly adaptable for the cutting of the stems of flowers.

The principal object of this invention is to provide a device which will cut the stems of flowers without crushing the stems.

A further object is to provide a device which may be locked in inoperative position so as to prevent unauthorized persons from manipulating the cutter.

A further object is to produce a device which is economical to manufacture, one which takes up a minimum amount of space, and one which is adequately protected against danger of a child inadvertently raising the handle to expose the blade.

Other objects and advantages will be apparent during the course of the following description.

In the accompanying drawings forming a part of this specification and in which like numbers are employed to designate like parts throughout the same, Fig. 1 is a side elevation of my flower stem cutter with the blade enclosed in the protecting shield;

Fig. 2 is a view similar to Fig. 1 with the shield in open position;

Fig. 3 is a cross-sectional view on an enlarged scale taken on the line 3—3 of Fig. 1; and Fig. 4 is an enlarged cross-sectional view taken on the line 4—4 of Fig. 1.

In trimming the stems of flowers, it is essential that the knife be relatively thin and that there be a slicing action so that when the stems are cut, they will not be crushed, which crushing tends to shorten the life of the cut flowers.

Also, due to the thinness of the blade of the cutting knife, the blade becomes a dangerous implement, particularly when children or unauthorized persons attempt to manipulate the same without knowledge of how the device works.

Applicant has therefore devised a flower cutter which will not only cut the stems without crushing them, but also a cutter wherein a locking mechanism prevents the sliding of the blade and the simultaneous locking of the handle and shield.

In the accompanying drawings, the numerals 5 and 6 designate legs having diverging foot portions which are adapted to be secured to any suitable support. By viewing Fig. 4, it will be noted that these legs are formed on opposite sides of the device and diverge so as to form a non-tipping base.

Extending between the legs 5 and 6 is a bar 7 upon which a blade 8 slides. This blade has slots 9 and 11. The slot 9 slides over the bolt 12, passing through the legs 5, and the slot 11 slides over the bolt 13 carried by the legs 6.

Pivoted as at 14 to the legs 6 is a pair of spaced bars 16 which are joined together at one end and have secured thereto a handle 17. Extending downwardly from one of the bars 16 is an offset crank 18, which is pivoted as at 19 to a link 21 pivoted as at 22 to the blade 8.

Also secured to the spaced bars 16 is a shield 23 having substantially the same curvature as the top of the blade 8 and adapted to enclose the blade 8 when the handle is in down position. It will be noted that the upper end of the legs 5 are turned outwardly so as to provide stops 24 to limit the downward movement of the handle.

By viewing Fig. 3, it will be noted that the bolt 12 has a wing nut 26 and that this nut passes through a substantially U-shaped locking member 27. A spring 28 is interposed between one of the legs 5 and the locking member. This locking member has a bent end 29 which extends around and behind the end of the blade adjacent the legs 5, while the opposite end of the locking member has a T-shaped end or head 31 which extends through the slot 9 and bears against the opposite side of the blade from the major portion of the locking member.

The result of this construction is that when the parts are in the position shown in Fig. 1 and the wing nut 26 is loosened, the locking member will be in the dotted line position of Fig. 3. At this time the handle 17 can be elevated, which will cause the offset crank 18 to actuate the link 21 and slide the blade 8 toward the left of the drawing, as shown in Fig. 2.

Now, by placing the stems of the flowers to be cut upon the knife and moving the knife from the position of Fig. 2 to that of Fig. 1, the parallel bars 16 will cause the stems to impinge upon the knife and at the same time the knife will be given a sliding or slicing movement to facilitate the cutting of the stems.

When the handle has reached its down position, it will come to a stop against the stops 24, and at that time the blade of the knife will be protected. After the operation has been completed, the operator then tightens the wing nut 26, which causes the end 29 of the locking member to move behind the end of the knife, as shown in full lines in Fig. 3. At that time it will be impossible to raise the handle due to the fact that it is connected to the blade through the offset crank 18 and the link 21, thereby eliminating any danger of unauthorized persons accidentally raising the handle and coming into contact with the blade.

It is to be understood that the form of my invention herewith shown and described is to be taken as a preferred example of the same and that various changes relative to the material, size, shape and ararngement of parts may be resorted to without departing from the spirit of the invention or the scope of the subjoined claims.

It will thus be seen that my invention accomplishes all of the objects above set forth.

Having thus described my invention, I claim:

1. A flower stem cutter comprising a supporting frame, a blade slidably mounted in said frame, said blade having slots formed therein for sliding engagement with said frame, a sliding bolt mounted in said frame and extending through one of said slots, a locking member mounted on said bolt, one end of said locking member having a T-shaped end extending through said slot and engaging the opposite side of said blade from the major portion of said locking member, said locking member having its opposite end bent and adapted to be moved into and out of alignment with the end of said blade through the actuation of said bolt.

2. In a flower stem cutter of the character described, a supporting frame having spaced legs, a horizontally arranged bar extending between said legs, a blade slidably supported on said bar, said blade having horizontally arranged slots at its opposite ends and a curved cutting edge arranged parallel with the supporting edge, said slots each engaging a bolt carried by said supporting frame, a pair of spaced bars pivoted to one of the legs of said frame, a handle carried by the free ends of said bars, a link connecting said bars and said blade whereby actuation of said handle will cause said blade to slide on said first mentioned bar, a shield carried by said parallel bars and adapted to enclose the curved cutting edge of said blade when said parallel bars are in a horizontal position and locking means mounted on one of said bolts, said means comprising a member having a T-shaped head extending through one of said slots in which said bolt is positioned, said locking member having an offset end bent and adapted to be moved into and out of alignment with the end of said blade to lock the reciprocal movement of said blade and said parallel blades against movement.

References Cited in the file of this patent

UNITED STATES PATENTS

| | | |
|---|---|---|
| 257,949 | Johnson | May 16, 1882 |
| 1,396,895 | Stolz | Nov. 15, 1921 |
| 1,601,414 | Purple | Sept. 28, 1926 |